Jan. 12, 1926.　　　　　　　　　　　　　　　　　1,569,273
J. M. GALBRAITH ET AL
LOCKED DUST CAP FOR TIRE VALVES
Filed Jan. 12, 1925
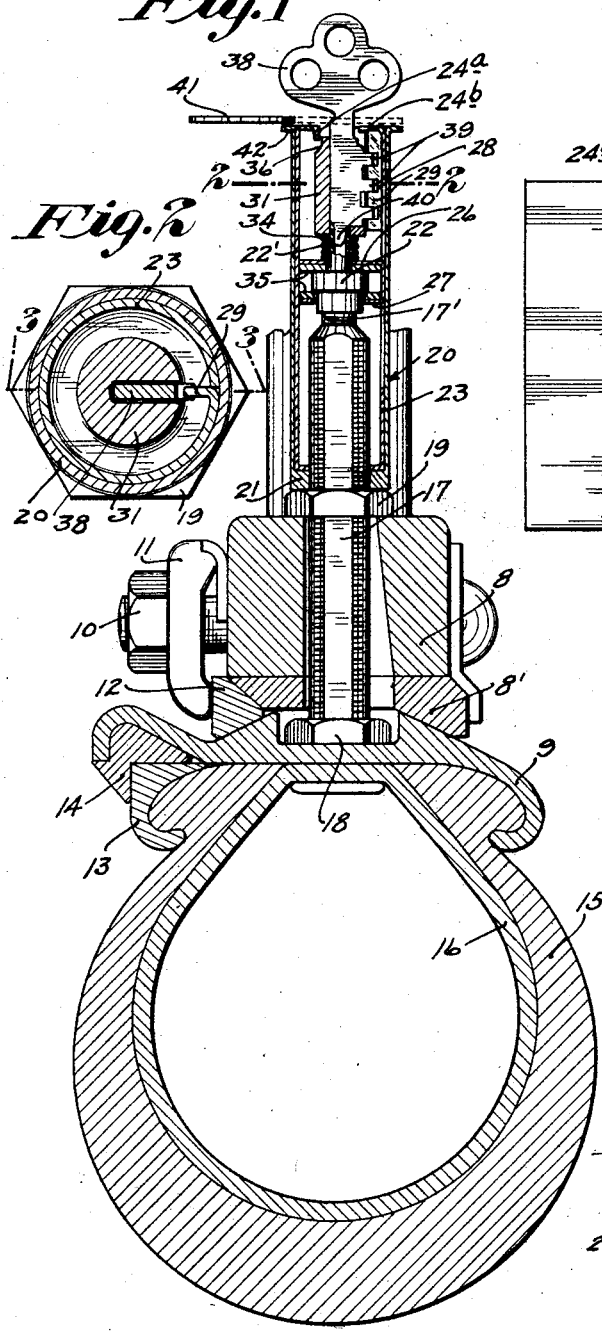
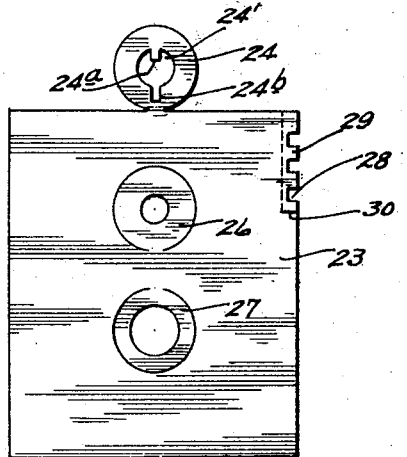
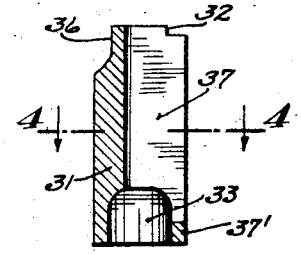
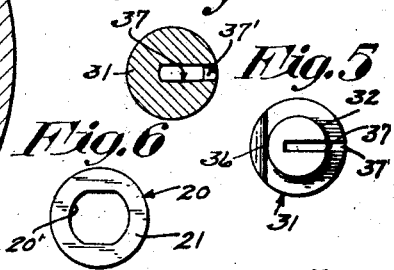
Inventors
John M. Galbraith
Louis N. Jensen
By their Attorneys Patented Jan. 12, 1926.

1,569,273

UNITED STATES PATENT OFFICE.

JOHN M. GALBRAITH, OF MINNEAPOLIS, AND LOUIS N. JENSEN, OF ST. PAUL, MINNESOTA; SAID GALBRAITH ASSIGNOR OF ONE-FOURTH TO MRS. KAREN JENSEN, OF ST. PAUL, MINNESOTA.

LOCKED DUST CAP FOR TIRE VALVES.

Application filed January 12, 1925. Serial No. 1,750.

*To all whom it may concern:*

Be it known that we, JOHN M. GALBRAITH and LOUIS N. JENSEN, citizens of the United States, residing respectively, at Minneapolis and St. Paul, in the counties of Hennepin and Ramsey and State of Minnesota, have invented certain new and useful Improvements in Locked Dust Caps for Tire Valves; and we do hereby declare the following to be a full, clear, and exact description of the invention, such as will enable others skilled in the art to which it appertains to make and use the same.

Our invention provides simple and efficient means for directly locking a dust cap to the valve stem of a pneumatic tire and, indirectly thereby, locking the tire and rim to the wheel of an automobile. Generally stated, the invention consists of the novel construction, combinations and arrangements of parts hereinafter described and defined in the claims.

In the accompanying drawings, which illustrate the invention, like characters indicate like parts throughout the several views.

Referring to the drawings:

Fig. 1 is a transverse section showing my invention as applied to the valve stem of a pneumatic tire, the latter being applied to the wheel by means of a demountable rim;

Fig. 2 is an enlarged section on the line 2—2 of Fig. 1;

Fig. 3 is an axial section through the lock tumbler, on the line 3—3 of Fig. 2;

Fig. 4 is a section on the line 4—4 of Fig. 3;

Fig. 5 is a plan or top view of the lock tumbler;

Fig. 6 is a bottom plan view of the dust cap; and

Fig. 7 shows a flat sheet of metal so stamped and cut that it may be bent to form a cylindrical dust cap lining having certain projecting bearings and lock detents.

The numeral 8 indicates an ordinary automobile wheel felly having the customary metallic felly band 8' to which a demountable rim 9 is secured by means of the customary nut-equipped bolt 10, clamp 11, and clamping ring 12. The rim 9, as shown, has a clincher side ring 13 held in place by a lock ring 14. The structure described may, however, take various forms so far as this invention is concerned.

The numeral 15 indicates the casing and the numeral 16 the inner tube of an ordinary pneumatic tire. The inner tube 16 is provided with the customery valve stem 17, which is extended through a demountable rim 9 and, as shown, is clamped thereto by a nut 18 in the usual way. Also, the valve stem extends through the usual passages formed in the felly 7 and band 8, and a nut 19 is tightened against the felly.

The dust cap 20 is a cylindrical metallic member, the body of which will fit loosely around the projecting portion of the valve stem and the end of which has an inturned flange 21 that will slip freely over the threads of the valve stem and will closely engage the flattened sides thereof (see Fig. 6). The valve stem 17 has a reduced externally threaded upper end 17' onto which the customary valve cap 22 is adapted to be screwed. This valve cap has the customary hollow stem 22' with the usual transverse notch at its upper end. In this improved dust cap, we preferably use this ordinary valve cap as a lock element but, as will presently appear, it is swiveled in the interior of the dust cap, so that it cannot become disassociated therefrom but is capable of being rotated so that it can be screwed onto or off from the threaded end 17' of the valve stem.

In Fig. 7, we have shown a sheet metal plate 23, preferably of steel, in flat condition or as it is formed when stamped from a larger sheet of metal. This sheet 23 is of such size that, when rolled into cylindrical form, it will fit very snugly or, in fact, may be driven under considerable friction into the interior of the dust cap and will then become, in effect, a fixed part of the dust cap, forming a sort of lining therefor. Bearing rings 24 and 25 are stamped out of the original sheet but left partly attached to the sheet 23, and these are adapted to be turned into axial alignment, as shown in Fig. 1. The ring 25 has a flattened hole 25' that is set into registration with the flattened hole 20' formed in the bottom of the dust cap and which, like said hole 20', will slip freely over the threads of the valve stem and closely engage the flattened sides of the valve stem and hold the dust cap against rotation when it has been axially slipped over the same into operative position. From the intermediate portion of the sheet 23, bearing rings 26 and 27 are stamped but left partly connected thereto, and these rings are adapted to be turned into axial alignment, as shown in Fig. 1. The bearing ring 26 has a hole that will quite closely fit the reduced stem 22' of the valve cap and the ring 27 has a hole that will closely fit the slightly reduced lower portion of said valve cap, and thus the valve cap is held within the dust cap against axial movements but free for rotary movements. Otherwise stated, said valve cap is swiveled within the dust cap.

At one edge, the sheet 23 is notched at 28 to form lock lugs 29. The part having the said notches and lock lugs is partly severed from the sheet 23 by a slit 30, which permits the said notched portion to be turned radially inward, as shown in Figs. 1 and 2.

Mounted within the upper portion of the dust cap, with freedom for rotary movements and for slight axial movements, is a substantially cylindrical tumbler 31, the extreme upper end of which is reduced at 32 so that it rotatively fits the hole 24' of the bearing ring 24. The said bearing ring 24 is provided at the edge of its hole 24' with a lock lip or lug 24ᵃ, which, in the completed device, is turned downward, as shown in Fig. 1, and entirely out of the hole 24'. The lower end of the tumbler 31 is recessed at 33 so that it fits loosely over the upper end portion of the valve cap stem 22'. A light coiled spring 34 is placed around the valve cap stem 22' and is compressed between the bearing ring 26 and the lower end of the tumbler 31. As shown, washers 35 are placed around the upper and lower portions of the valve stem cap 22 and against the opposing faces of the bearing rings 26 and 27. The tumbler 31, at its extreme upper end, has a flattened surface or notch 36 with which the downturned lug 24ᵃ normally engages to hold the tumbler against rotation. The said tumbler is provided with a narrow radial key slot 37 that extends from the upper end thereof nearly but not quite through the lower end of said tumbler, leaving a cross portion 37' with which the lower end of the operating key 38 will engage when the key is pressed downward. To permit the key to be passed through the upper bearing ring 24, the latter is provided with a radial notch 24ᵇ with which the key slot 37 of the tumbler is normally aligned. The said key is provided with projecting lugs 39, which, when the tumbler is properly manipulated, will align with and pass through the notches 28 of the plate 23. The extreme lower end of the key is formed with a point 40 that will enter the tubular stem 22' of the valve cap and engage the notch thereof so that the cap and key and tumbler will all turn together. The numeral 41 indicates a keyhole cover pivoted to the outturned flange at the upper end of the dust cap at 42.

As already noted, the tumbler 31 is normally held against rotation by engagement of the lug 24ᵃ with its flattened surface or notch 36. When the key 38 is inserted into the tumbler and its lower end 40 engaged with the notch in the valve cap stem 22' and the key is then pressed downward so as to compress the spring 24, the tumbler 31 will be pressed downward so as to carry its flattened surface 36 below the lug 24ᵃ, thereby releasing said tumbler for rotation. The above described depression or inward movement of the tumbler was further necessary in order to bring the key lugs 39 into alignment with the notches 28 of the liner plate 23. Thus, it will be seen that, when the key is forced down and the tumbler depressed, as stated, the key and the tumbler may be freely rotated. This rotation of the tumbler and key will also rotate the valve cap 22 so that the said cap may be readily screwed onto or off from the reduced threaded end 17ᵃ of said valve stem. Obviously, when the valve stem cap 22 is screwed onto the reduced end of the valve stem, the dust cap 20 will be pressed down against the nut 19 and the said dust cap will be securely locked to the valve stem. The tire cannot be removed from the rim nor can the rim be removed from the wheel as long as the dust cap is locked to the valve stem and, hence, this lock-equipped dust cap serves as a lock to prevent either the tire or rim or both from being maliciously removed from the wheel or stolen. Of course also, the dust cap, when locked to the valve stem, prevents mischievous or malicious persons from tampering with the valve to deflate the tire.

The key can be removed from the tumbler only when its lugs 39 are turned into alignment with the notch 24ᵇ of the bearing 24 and at this time, it will be remembered, the notch 36 will be aligned for engagement with the lock lug 24ᵃ so that the tumbler will, under the action of the spring 34 and the said lug 24ᵃ, be held against rotation whenever the key is removed or, in fact, whenever pressure is removed from the key, even if the key be left in the tumbler. Of course, the tumbler cannot be rotated when the key is in the tumbler until the tumbler is depressed, as above indicated, so as to carry its lugs 39 out of alignment with the lugs 29 and into alignment with the notches 28 of the plate 23.

The device described may be made at small cost and may be applied to standard tire valve stems. Of course, it may be made in the several different sizes required to fit the several different sizes of valve stems.

What we claim is:

1. A dust cap applicable to a tire valve stem and having a key-actuated nut-acting member arranged for threaded engagement with said valve stem, said member being arranged to be rotated by a key inserted into the outer end of the dust cap.

2. A dust cap having a key-actuated valve cap swiveled therein, said dust cap being applicable to a valve stem having a threaded end, and said valve cap being arranged to be screwed onto the threaded end of the valve stem by a key inserted into the dust cap.

3. A dust cap adapted for application to a tire valve stem that has a threaded end, a nut-acting valve cap rotatably mounted within said dust cap and arranged for threaded engagement with the end of the valve stem, and arranged to be rotated by a key inserted into the outer end of said dust cap and the said dust cap having lock elements cooperating with said key to control the rotation of said key and hence of said valve cap.

4. A tubular dust cap adapted for application over a tire valve stem that has a threaded end, of a nut-acting valve cap rotatably mounted in said dust cap and engageable with the threaded end of the valve stem, a key-operated lock tumbler rotatably mounted in the outer end of said dust cap, a spring yieldingly pressing said tumbler axially outward, said dust cap and tumbler having lock elements normally engaged to prevent rotation of the tumbler but releasable by inward axial movement of the tumbler.

5. A tubular dust cap adapted for application over a tire valve stem that has a threaded end, of a nut-acting valve cap rotatably mounted in said dust cap and engageable with the threaded end of the valve stem, a key-operated lock tumbler rotatably mounted in the outer end of said dust cap, a spring yieldingly pressing said tumbler axially outward, said dust cap and tumbler having lock elements normally engaged to prevent rotation of the tumbler but releasable by inward axial movement of the tumbler, said dust cap having internal key-engaging lugs and intervening key lug clearance passages arranged to permit rotation of said tumbler only when the key and tumbler are pressed inward from normal position.

6. A dust cap applicable to a tire valve stem and provided with a lock for securing the same to a valve stem, the inner end of said dust cap being provided with a valve stem passage with flattened sides adapted to engage the flat sides of a flattened valve stem and thereby hold said dust cap against rotation.

7. The structure defined in claim 4 in which the inner end of said dust cap is provided with a valve stem passage with flattened sides adapted to engage the flat sides of a flattened valve stem and thereby hold said dust cap against rotation.

8. The structure defined in claim 3 in which said nut-acting valve cap has a notched outwardly projecting stem with the notch of which the inner end of the operating key may be engaged to rotate said nut-acting valve cap.

9. The structure defined in claim 4 in which said valve cap has a notched outwardly projecting stem with which the inner end of the operating key is engageable, and in which the said spring is a coiled spring placed around said notched stem and engageable with the inner end of said tumbler.

10. The structure defined in claim 4 in which said dust cap at its inner end has a flattened valve stem passage engageable with the flattened sides of a flattened valve stem to hold said dust cap against rotation on the valve stem.

11. The structure defined in claim 4 in which said valve cap is provided with a reduced outwardly projecting notched stem and the said tumbler at its inner end is recessed to receive the outer end of said notched stem.

12. The combination with a tubular dust cap, of a metallic lining plate tightly fitting the interior thereof, said lining plate having integral bearing ring portions formed integral therewith and bent at right angles to the axis of the dust cap, a nut-acting valve cap swiveled in the the two intermediate members of said bearing rings, the inner end of the bearing ring of said lining plate and the inner end of said dust cap having coincident valve stem passages, a tumbler journaled in the outer bearing ring of said lining plate and on the outer end of said valve cap, said tumbler having a key slot with which an operating key may be engaged and said lining plate further having inturned lugs affording notches through which lugs on the key may be moved.

13. The structure defined in claim 12 in which the valve stem passages in the inner ends of said dust cap and lining plate are flattened for engagement with the flat sides of a flattened valve stem to hold the dust cap against rotation on the valve stem.

14. The structure defined in claim 12 in further combination with a coiled spring placed around the outer end of said valve cap and compressed between the inner end of said tumbler and the adjacent bearing ring, said tumbler having a limited axial movement, and said tumbler in the outer bearing ring having lock elements normally holding the tumbler against rotation but permitting the tumbler to be rotated when pressed axially inward against the tension of said spring.

In testimony whereof we affix our signatures.

JOHN M. GALBRAITH.
LOUIS N. JENSEN.